E. L. FLUM AND J. A. MASCHINO.
AUTOMOBILE JACK.
APPLICATION FILED MAR. 5, 1918.
1,337,125.
Patented Apr. 13, 1920.
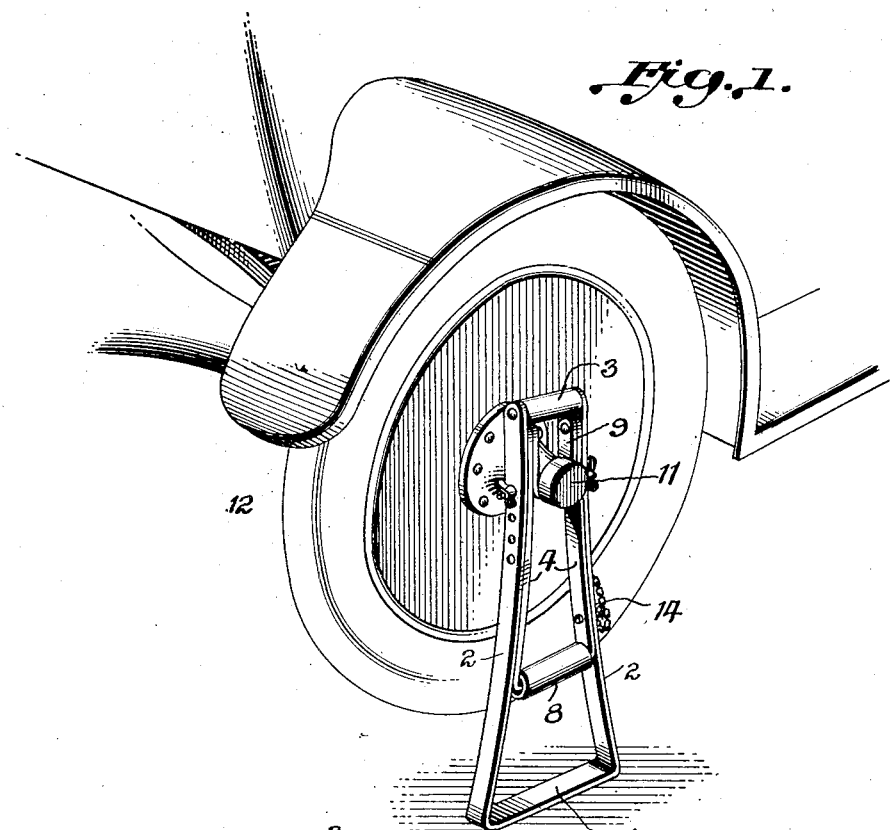
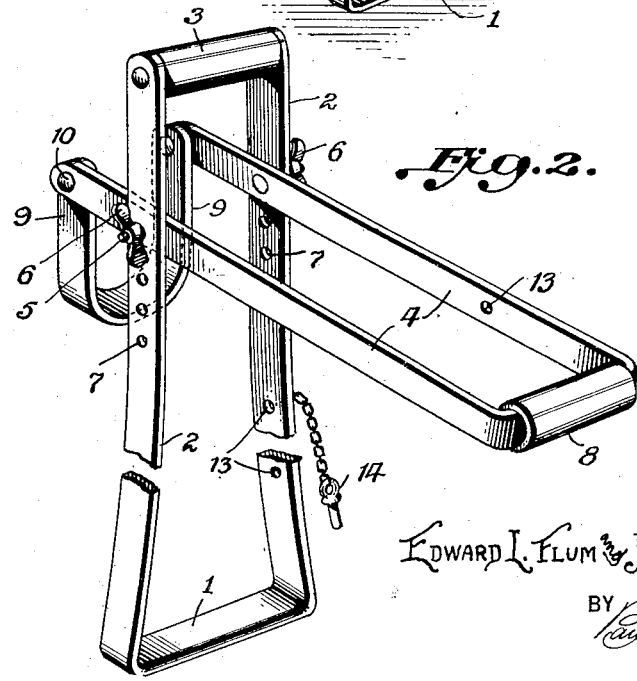
INVENTORS
Edward L. Flum & John A. Maschino
BY
ATTORNEYS.

UNITED STATES PATENT OFFICE.

EDWARD L. FLUM, OF HIGHLAND PARK, MICHIGAN, AND JOHN A. MASCHINO, OF SEYMOUR, INDIANA.

AUTOMOBILE-JACK.

1,337,125.   Specification of Letters Patent.   Patented Apr. 13, 1920.

Application filed March 5, 1918. Serial No. 220,422.

*To all whom it may concern:*

Be it known that we, EDWARD L. FLUM and JOHN A. MASCHINO, citizens of the United States of America, residing at Highland Park, county of Wayne, and State of Michigan, and Seymour, county of Jackson, State of Indiana, respectively, have invented certain new and useful Improvements in Automobile-Jacks, of which the following is a specification, reference being had therein to the accompanying drawings.

This invention relates to jacks, and the primary object of our invention is to provide a simple and inexpensive jack that may be readily carried in an automobile kit or at some convenient place about an automobile and used for raising a wheel of the automobile, without the necessity of placing the jack between the wheels and under the axle, as is the usual custom.

Another object of our invention is to provide an automobile jack consisting of a supporting member, a lever member and a suspension member, these members being arranged so that the suspension member can be placed under the hub of a wheel and the lever member manually actuated to raise the wheel. When the jack is not in use the members can be compactly arranged to occupy a comparatively small space.

A further object of our invention is to provide a jack of the above type having an adjustable leverage member that permits of the jack being used in connection with wheels of various sizes, and provision is made for securing the lever member against accidental displacement when the jack is supporting a wheel.

The above and other objects are attained by a mechanical construction that will be hereinafter specifically described and then claimed, and reference will now be had to the drawings, wherein—

Figure 1 is a perspective view of the jack as supporting an automobile wheel; and Fig. 2 is a similar view of the jack partly broken away.

To put our invention into practice, we provide a supporting member 1 that is somewhat U-shaped, said member having side arms 2 with the upper ends thereof connected by a handle 3. The lower ends of the side arms 2 diverge at the base of the member 1 so as to form a substantial foot or base for said member.

Between the upper ends of the arms 2 is a yoke shaped lever member 4 and said member is held in engagement with the arms 2 by bolts 5 and winged thumb nuts 6, the bolts 5 serving as a fulcrum or pivot for the lever member and also permitting of said lever member being detached or set in other positions for wheels of various sizes. With a series of openings 7 in the side arms 2, the pivoted lever member can be correctly positioned so as to elevate wheels of various size from the ground.

One end of the lever member has a handle 8, preferably in the form of a sleeve, and the other end of the lever member is provided with a U-shaped suspension member 9 that is pivotally connected to the ends of the lever member 4, as at 10. The suspension member 9 is within the lever member 4 and with said lever member swung at an angle to the supporting member 1, the suspension member 9 can be easily placed under the hub 11 of the wheel 12. Then by lowering the outer end of the lever member 4 the wheel 12 will be elevated from the ground.

To positively hold the lever 4 within the supporting member 1, one of the side arms 2 of the supporting member and one of the side arms of the lever member may be provided with apertures 13 to receive a pin 14.

It will be noted that the various members of the jack may be nested, as shown in Fig. 1, and when in such form provide a comparatively flat structure that will occupy a comparatively small space in an automobile. Besides, the jack can be easily carried and is inexpensive in manufacture. It is preferable to make the various members of strap iron bent to shape and the handle sleeve 8 can be placed in position prior to bending the lever member to proper form.

One embodiment of our invention has been illustrated and it is to be understood that the structural elements are susceptible to such variations and modifications as fall within the scope of the appended claim.

What we claim is:—

An automobile jack comprising a substantially U-shaped supporting member made of a single piece of material bent to provide a wide base, a handle mounted in the upper end of said supporting member and preventing collapse of the side walls thereof, a yoke-shaped lever member made of a single piece of metal and having its side walls pivotally mounted in said supporting member and adapted to swing therein, a roller handle on the inner end of said lever member, a U-shaped suspension member pivotally mounted in the outer end of said lever member and adapted to swing therein so that all of said members may be placed in a common plane, said U-shaped suspension member having its pivoted end open so that said lever member may be manipulated to cause said suspension member to carry a wheel hub into said supporting member and under the handle thereof, and means carried by said supporting member and adapted to engage said lever member to hold said lever member swung into said supporting member.

In testimony whereof I affix my signature in presence of two witnesses.

EDWARD L. FLUM.

Witnesses:
 KARL H. BUTLER,
 G. E. McGRANN.

In testimony whereof I affix my signature in the presence of two witnesses.

JOHN A. MASCHINO.

Witnesses:
 HENRY HOHNSTREITER,
 ELMER FLEMING.